(12) United States Patent
Yoshida et al.

(10) Patent No.: US 11,655,832 B2
(45) Date of Patent: May 23, 2023

(54) CONTROL METHOD OF GAS PRESSURE ACTUATOR AND CONTROL CALCULATION DEVICE

(71) Applicant: SUMITOMO HEAVY INDUSTRIES, LTD., Tokyo (JP)

(72) Inventors: Tatsuya Yoshida, Kanagawa (JP); Shinya Hamada, Kanagawa (JP)

(73) Assignee: SUMITOMO HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 17/542,010

(22) Filed: Dec. 3, 2021

(65) Prior Publication Data

US 2022/0178389 A1 Jun. 9, 2022

(30) Foreign Application Priority Data

Dec. 7, 2020 (JP) .............................. JP2020-202876

(51) Int. Cl.
*F15B 9/09* (2006.01)
(52) U.S. Cl.
CPC .......... *F15B 9/09* (2013.01); *F15B 2211/6336* (2013.01); *F15B 2211/6656* (2013.01)

(58) Field of Classification Search
CPC .......... F15B 15/2838; F15B 2211/6656; F15B 2211/6336; F15B 2211/3057
See application file for complete search history.

(56) References Cited

U.S. PATENT DOCUMENTS

| | | | |
|---|---|---|---|
| 3,757,645 A | * | 9/1973 | Roch .................... B21D 43/287 91/196 |
| 6,789,457 B2 | | 9/2004 | Sakaki et al. |
| 2004/0050244 A1 | * | 3/2004 | Sakaki ...................... F15B 9/09 91/363 R |

FOREIGN PATENT DOCUMENTS

JP 2002-295404 A 10/2002

* cited by examiner

*Primary Examiner* — Abiy Teka
(74) *Attorney, Agent, or Firm* — Michael Best & Friedrich LLP

(57) ABSTRACT

A control calculation device performs a calculation of compensating for a volume change amount of each pressure chamber caused by a positional change of a pressure receiving plate inside a cylinder chamber for each position command value applied to two servo amplifiers, outputs each of the compensated position command values to the two servo amplifiers, and executes origin positioning for a position of a slider in order to compensate for the volume change amount.

4 Claims, 1 Drawing Sheet

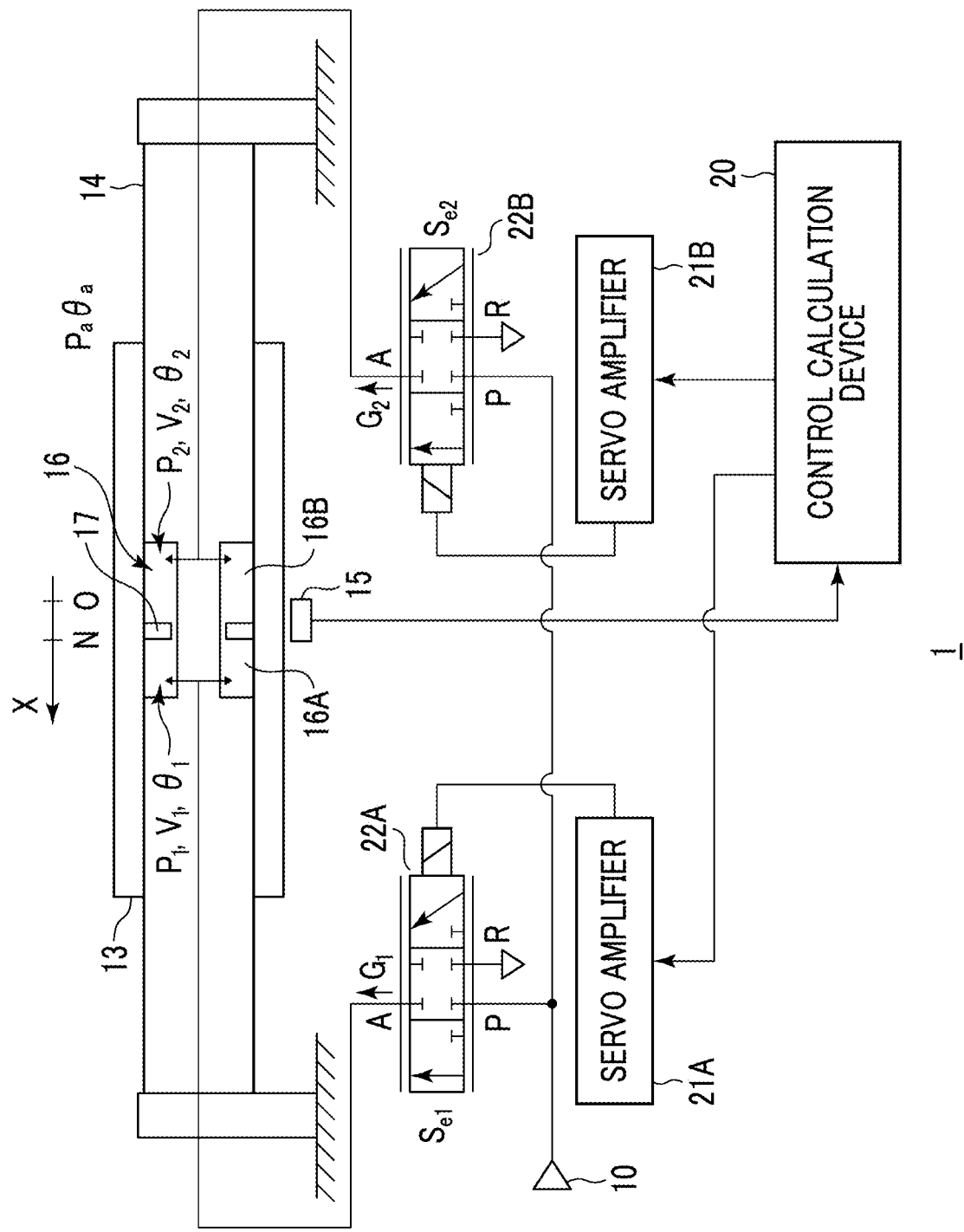

CONTROL METHOD OF GAS PRESSURE ACTUATOR AND CONTROL CALCULATION DEVICE

RELATED APPLICATIONS

The content of Japanese Patent Application No. 2020-202876, on the basis of which priority benefits are claimed in an accompanying application data sheet, is in its entirety incorporated herein by reference.

BACKGROUND

Technical Field

Certain embodiments of the present invention relate to a control method of a gas pressure actuator and a control calculation device.

Description of Related Art

Gas pressure actuators are known in which a guide shaft and a slider, which is movable along the guide shaft, are included, a cylinder chamber is formed between the guide shaft and the slider, a pressure receiving plate for partitioning the cylinder chamber into two pressure chambers in a moving direction is provided in one of the guide shaft and the slider, and the slider is driven by a differential pressure between the two pressure chambers by allowing compressed gas to enter and exit each of the two partitioned pressure chambers via servo valves. In the related art, a gas pressure actuator capable of compensating a dynamic characteristics change depending on a position of a slider and stably controlling the slider within a stroke has been proposed.

SUMMARY

The present invention has been made in such a situation, and it is desirable to provide a technique that enables more stable positioning control.

According to an embodiment of the present invention, there is provided a control method of a gas pressure actuator which includes a guide portion and a slider configured to move along the guide portion, and in which a cylinder chamber is formed between the guide portion and the slider, a pressure receiving plate for partitioning the cylinder chamber into two pressure chambers in a moving direction is provided in one of the guide portion and the slider, and the slider is driven by a differential pressure between the two pressure chambers by allowing compressed gas to enter and exit each of the two partitioned pressure chambers via servo valves, the gas pressure actuator including a position sensor for detecting a position of the slider, two servo amplifiers for controlling each of two servo valves, and a control calculation device that receives a position detection signal from the position sensor and outputs a position command value to the two servo amplifiers, the control method including: causing the control calculation device to perform a calculation of compensating for a volume change amount of each pressure chamber caused by a positional change of the pressure receiving plate inside the cylinder chamber, for each position command value applied to the two servo amplifiers, and thereafter output each of the compensated position command values to the two servo amplifiers, and execute origin positioning for the position of the slider in order to compensate for the volume change amount.

Another embodiment of the present invention is a control method of a gas pressure actuator. The control method of the gas pressure actuator which includes a guide portion and a slider configured to move along the guide portion, and in which a cylinder chamber is formed between the guide portion and the slider, a pressure receiving plate for partitioning the cylinder chamber into two pressure chambers in a moving direction is provided in one of the guide portion and the slider, and the slider is driven by a differential pressure between the two pressure chambers by allowing compressed gas to enter and exit each of the two partitioned pressure chambers via servo valves, the gas pressure actuator including a position sensor for detecting a position of the slider, two servo amplifiers for controlling each of the two servo valves, and a control calculation device that receives a position detection signal from the position sensor and outputs a position command value to the two servo amplifiers, the control method including: causing the control calculation device to switch a gain at the time when each position command value applied to the two servo amplifiers is calculated based on the position detection signal from the position sensor, before and after a completion of origin positioning for the position of the slider.

Further another embodiment of the present invention is a control calculation device. The control calculation device for a gas pressure actuator which includes a guide portion and a slider configured to move along the guide portion, and in which a cylinder chamber is formed between the guide portion and the slider, a pressure receiving plate for partitioning the cylinder chamber into two pressure chambers in a moving direction is provided in one of the guide portion and the slider, and the slider is driven by a differential pressure between the two pressure chambers by allowing compressed gas to enter and exit each of the two partitioned pressure chambers via servo valves, the gas pressure actuator including a position sensor for detecting a position of the slider, and two servo amplifiers for controlling each of two servo valves, the control calculation device receiving a position detection signal from the position sensor and outputting a position command value to the two servo amplifiers, in which the control calculation device configured to perform a calculation of compensating for a volume change amount of each pressure chamber caused by a positional change of the pressure receiving plate inside the cylinder chamber for each position command value applied to the two servo amplifiers, and thereafter output each of the compensated position command values to the two servo amplifiers, and execute origin positioning for the position of the slider in order to compensate for the volume change amount.

Further another embodiment of the present invention is a control calculation device. The control calculation device for a gas pressure actuator which includes a guide portion and a slider configured to move along the guide portion, and in which a cylinder chamber is formed between the guide portion and the slider, a pressure receiving plate for partitioning the cylinder chamber into two pressure chambers in a moving direction is provided in one of the guide portion and the slider, and the slider is driven by a differential pressure between the two pressure chambers by allowing compressed gas to enter and exit each of two partitioned pressure chambers via servo valves, the gas pressure actuator including a position sensor for detecting a position of the slider, and two servo amplifiers for controlling each of the two servo valves, the control calculation device receiving a position detection signal from the position sensor and outputting a position command value to the two servo amplifiers, in which the control calculation device configured to switch a gain at the time when each position command value applied to the two servo amplifiers is calculated based on the position detection signal from the position sensor, before and after a completion of origin positioning for the position of the slider.

It should be noted that any combination of the above component or those in which the component or expressions of the present invention are mutually replaced between methods, devices, systems, and the like are also effective as aspects of the present invention.

BRIEF DESCRIPTION OF THE DRAWING

FIG. 1 is a cross-sectional view of a gas pressure actuator according to one embodiment.

DETAILED DESCRIPTION

Hereinafter, the same or equivalent component and member shown in the drawings shall be designated by the same reference numerals, and redundant description will be omitted as appropriate. Further, the dimensions of the member in each drawing are shown enlarged or reduced as appropriate for easy understanding. Further, some of the members that are not important for describing the embodiment in each drawing are omitted.

FIG. 1 is a cross-sectional view of a gas pressure actuator according to one embodiment. The gas pressure actuator 1 includes a guide shaft 14 whose both end portions are fixed by support bodies and extends in one axial direction, and a slider 13 that is movable along the guide shaft 14. The slider 13 has a tubular body that can surround a periphery of the guide shaft 14. A cylinder space 16 is formed between the guide shaft 14 and the slider 13. In this example, a central portion of the guide shaft 14 is formed thin so that the cylinder space 16 is formed between the slider 13 and the guide shaft 14.

A pressure receiving plate (partition wall) 17 is fixed to an inner wall of the slider 13. The pressure receiving plate 17 is movable along the guide shaft 14 together with the slider 13. The pressure receiving plate 17 may be fixed to the guide shaft 14. The cylinder space 16 is partitioned into a pressure chamber 16A and a pressure chamber 16B in the axial direction by the pressure receiving plate 17.

The slider 13 and the guide shaft 14 form a static pressure gas bearing. Specifically, by ejecting a compressed gas (for example, air) from an air pad provided inside the slider 13 or outside the guide shaft 14, the slider 13 can float from the guide shaft 14, and the slider 13 can move without contacting the guide shaft 14. Therefore, the sliding resistance is not generated during movement.

A position sensor 15 detects information related to a position of the slider 13 and outputs the information related to the position by an electric signal. A position detection signal from the position sensor 15 is input to an control calculation device 20.

The control calculation device 20 performs a control calculation based on the input position information and outputs a position command signal to servo amplifiers 21A and 21B. In this case, as command values for the servo amplifiers 21A and 21B, values having the same absolute value and the inverted sign are used.

The servo amplifiers 21A and 21B control each of spool positions of servo valves 22A and 22B according to this command value.

The compressed gas (for example, air) adjusted to an appropriate pressure is supplied to the servo valves 22A and 22B by a regulator (not shown), and a passing flow rate varies depending on the spool position in the servo valves 22A and 22B. The gas that passes through the servo valves 22A and 22B is supplied to the two pressure chambers 16A and 16B provided in the slider 13. As a result, a differential pressure is generated in the pressure chambers 16A and 16B, and the differential pressure reacts on the pressure receiving plate 17 attached to the inner wall of the slider 13 to move the slider 13.

Since such a gas pressure actuator can control a large output with a compact structure, it is expected to be used as an actuator for positioning between two points. However, when continuous positioning is performed, a stable control is difficult for such a gas pressure actuator due to non-linear characteristics such as a dynamic characteristics change depending on the position of the pressure receiving plate, thereby it is difficult to take an effective stroke longer than the mechanical stroke of the slider. This is because when the position of the pressure receiving plate changes inside the cylinder chamber, the pressure inside the pressure chamber also changes, which affects the stable control.

In the gas pressure actuator 1 in which the slider 13 is driven by the gas pressure using the two servo valves 22A and 22B, a method of stably controlling the slider 13 within a stroke by compensating for the dynamic characteristics change depending on the position of the slider 13 will be described.

The main symbols shown below are a pressure P, a volume V, a temperature θ, a gas constant R, and a pressure receiving area A of the pressure receiving plate 17, and the subscript 1 indicates a state quantity on the pressure chamber 16A side, and the subscript 2 indicates the state quantity on the pressure chamber 16B side. Further, in various equations shown below, the one with a • (dot) above the symbol indicates the first-order time differential, for example, the one with a dot above the symbol x is called an x dot, and the one with two • (dots) above the symbol indicates the second-order time differential, for example, the one with two dots above the symbol x is called x double dots. On the other hand, the one with a - (bar) above the symbol indicates a state quantity when the pressure chambers 16A and 16B are in a equilibrium state, for example, the one with a bar above the symbol P is called a P bar.

As described above, the gas pressure actuator 1 of the present embodiment uses the two servo valves 22A and 22B, the two servo amplifiers 21A and 21B, and the control calculation device 20 to control the compressed gas flow rate to the pressure chambers 16A and 16B and is an actuator that drives the slider 13 by the differential pressure between the pressure chambers 16A and 16B.

When it is assumed that the state change of the gas in the pressure chamber is an adiabatic change (adiabatic coefficient k), the state change is represented by the following equation (1).

$$\dot{P}_1 = -\frac{\kappa A P_1}{V_1}\dot{x} + \frac{\kappa R \theta_1}{V_1} G_1 \qquad (1)$$

Here, $G_1$ represents the mass flow rate of the gas supplied from the servo valves 22A.

Since the state equation of the equation (1) is non-linear, the characteristics change when the volume of the pressure chamber changes.

When the pressure receiving plate 17 is linearized with the state, where the slider 13 is stopped while the pressure receiving plate 17 is positioned in the vicinity of the center of the slider 13 (pressure P bar, volume V bar, temperature θ bar), as a reference state, the following equation (2) is obtained.

$$\dot{P}_1 = -\frac{\kappa A \overline{P}}{\overline{V}}\dot{x} + \frac{\kappa R \overline{\theta}}{\overline{V}}G_1 \quad (2)$$

In this case, the temperature change is assumed to be very small, and represents as $\theta_1 = \theta$ bar. In the equation (2), since the volume is V bar=constant with the center of the slider as the reference state, there is no characteristics change.

When it is assumed that an input $G_1$ of the equation (1) is $G_1'$ to make the following equation (3), and it is considered that an input such as the following equation (4).

$$\dot{P}_1 = -\frac{\kappa A P_1}{V_1}\dot{x} + \frac{\kappa R \theta_1}{V_1}G_1' \quad (3)$$

$$G_1' = \frac{AV_1}{R\theta_1}\left(-\frac{\overline{P}}{\overline{V}} + \frac{P_1}{V_1}\right)\dot{x} + \frac{V_1 \overline{\theta}}{\overline{V}\theta_1}G_1 \quad (4)$$

When substituting equation (4) into equation (3), the nonlinear equation in equation (1) becomes equal to the linear equation in equation (2).

An equation in which a passing flow rate equation of the servo valves 22A is linearized (the servo valves 22A are in a supply state and the servo valves 22B are in an exhaust state), is represented by the following equation (5).

$$G_1 = K_f K_{se} \delta \frac{\overline{P}}{\sqrt{R\overline{\theta}}} u_1 \quad (5)$$

Here, $K_f$ and $\delta$ are coefficients determined by the shape or supply pressure of the servo valves, $K_{se}$ is a gain between the servo valves opening degree and the command to the servo amplifier, and $u_1$ is a position command value to the servo amplifier 21A.

When the input to the new servo amplifier 21A is defined as $u_1'$ in the equation (5), and the following equation (6) is obtained from the equations (4) and (5), the compensation (mass flow rate equation) of the equation (4) can be converted into the command value equation to the servo amplifier 21A.

$$u_1' = \frac{AV_1 \sqrt{R\overline{\theta}}}{K_f K_{se} \delta \overline{P} R \theta_1}\left(-\frac{\overline{P}}{\overline{V}} + \frac{P_1}{V_1}\right)\dot{x} + \frac{V_1 \overline{\theta}}{\overline{V}\theta_1} u_1 \quad (6)$$

Since this equation uses the command from the control calculation device 20 to the servo amplifier 21A as input and output, the calculation of the equation (6) is performed by the control calculation device 20, and the new input $u_1'$ is output to the servo amplifier 21A.

The servo valves 22A is assumed to be on an exhaust side for the pressure chamber 16B, the passing flow rate equation of the servo valves 22B is represented by the following equation (7)

$$G_2 = K_f K_{se} \frac{\overline{P}}{\sqrt{R\overline{\theta}}} u_2 \quad (7)$$

When the equation corresponding to the equation (6) is derived in the same manner for the pressure chamber 16B side, the following equation (8) is obtained.

$$u_2' = \frac{AV_2 \sqrt{R\overline{\theta}}}{K_f K_{se} \overline{P} R \theta_2}\left(\frac{\overline{P}}{\overline{V}} + \frac{P_2}{V_2}\right)\dot{x} + \frac{V_2 \overline{\theta}}{\overline{V}\theta_2} u_2 \quad (8)$$

By incorporating compensation such as equations (6) and (8) into the control calculation performed by the control calculation device 20, the dynamic characteristics change due to the positional change of the slider 13, that is, the positional change of the pressure receiving plate 17 inside the slider 13 is canceled, and the dynamic characteristics match the characteristics when the pressure receiving plate 17 is in the center of the slider 13 regardless of the position in the slider 13.

The reaction of the control calculation device 20 will be described below in order.

(1) A position of the slider 13 is detected by the position sensor 15, and an electric signal indicating the position information is obtained. The position detection signal from the position sensor 15 is input to the control calculation device 20. The control calculation device 20 performs the following calculations (2) to (6).

(2) A velocity x dot is calculated by differentiating the slider position x input from the position sensor 15, and the acceleration x double dots is calculated by further differentiating.

(3) By using the slider target position $X_{ref}$, the slider position x, the velocity x dot, and the acceleration x double dots, the position command value u is calculated based on the following equation (9).

$$u = K_p(x_{ref} - x) - K_v \dot{x} - K_a \ddot{x} \quad (9)$$

Here, $K_p$, $K_v$, and $K_a$ are a proportional gain, a velocity gain, and an acceleration gain that are appropriately designed, respectively.

(4) The position command values $u_1$ and $u_2$ to the servo amplifiers 21A and 21B are calculated as follows.

$$u_1 = u$$

$$u_2 = -u$$

(5) A new position command value $u_1'$ to the servo amplifier 21A is calculated by using the equation (6) as shown in the following equation (10).

$$u_1' = \frac{AV_1}{K_f K_{se} \delta \overline{P} \sqrt{R\theta_a}}\left(-\frac{\overline{P}}{\overline{V}} + \frac{\overline{P}_1}{V_1}\right)\dot{x} + \frac{V_1}{\overline{V}} u_1 \quad (10)$$

Here, the pressure $P_1$ in the equation (6) is the equilibrium pressure P bar (measured in advance) when the slider is stopped, and the temperature $\theta_1$ is the equilibrium temperature θ bar=atmosphere temperature $\theta_a$. Further, the position command value $u_2'$ to the servo amplifier 21B is calculated by using the equation (8) as described in the following equation (11).

$$u'_2 = \frac{AV_2}{K_f K_{se} \overline{P} \sqrt{R\theta_a}} \left( \frac{\overline{P}}{\overline{V}} + \frac{\overline{P_1}}{V_2} \right) \dot{x} + \frac{V_2}{\overline{V}} u_2 \quad (11)$$

Here, the pressure $P_2$ in the equation (8) is the equilibrium pressure $\overline{P}$ bar when the slider is stopped, and the temperature $\theta_2$ is the equilibrium temperature $\overline{\theta}$ bar=atmosphere temperature $\theta_a$.

In the equations (10) and (11), the servo valves 22A are on the supply side and the servo valves 22B are on the exhaust side.

When the supply side and the exhaust side are opposite, the following equations (12) and (13) are used.

$$u'_1 = \frac{AV_1}{K_f K_{se} \overline{P} \sqrt{R\theta_a}} \left( -\frac{\overline{P}}{\overline{V}} + \frac{\overline{P}}{V_2} \right) \dot{x} + \frac{V_2}{\overline{V}} u_1 \quad (12)$$

$$u'_2 = \frac{AV_2}{K_f K_{se} \delta \overline{P} \sqrt{R\theta_a}} \left( \frac{\overline{P}}{\overline{V}} + \frac{\overline{P}}{V_2} \right) \dot{x} + \frac{V_2}{\overline{V}} u_2 \quad (13)$$

Since the cross-sectional area inside the slider 13 is constant with respect to the axial direction and is known, $V_1$ and $V_2$ can be calculated by knowing the position of the slider 13.

(6) The position command value $u_1'$ is output to the servo amplifier 21A, and the position command value $u_2'$ is output to the servo amplifier 21B.

(7) The servo amplifiers 21A and 21B control each of the spool positions of the servo valves 22A and 22B according to the position command value. The gas adjusted to the appropriate pressure is supplied to the servo valves 22A and 22B, and the compressed gas flow rate, which passes through, varies according to the spool positions of the servo valves 22A and 22B.

(8) The gas that passes through the servo valves 22A and 22B is supplied to the two pressure chambers 16A and 16B inside the slider 13. Thereafter, the differential pressures of the pressure chambers 16A and 16B reacts on the slider 13 to drive the slider 13.

(9) (1) to (8) are repeated and the slider 13 is position controlled to the target position $X_{ref}$.

As is clear from the above description, in the present embodiment, the compressed gas flow rate to the two pressure chambers are controlled by the two servo valves, and in a double acting gas pressure actuator that performs the position control of the slider, the positioning control of adding compensation for the dynamic characteristics change, obtained due to the positional change of the slider, to the control method is performed in order to take a long effective stroke and perform stable positioning control. More specifically, in the present embodiment, the compensation (non-linear compensation for the dynamic characteristics change) for the dynamic characteristics change due to the positional change of the slider 13 and the pressure receiving plate 17 is executed by performing a calculation of compensating for the pressure change amount and the volume change amount in each pressure chamber caused by the positional change of the slider 13 and the pressure receiving plate 17.

Subsequently, in the above equations (6) and (8), the state change of the gas is derived as the adiabatic change, but since the same equation can be obtained by substituting an adiabatic coefficient k with a polytropic index n and deriving the polytropic index n, the above technical idea can be applied to the case of other state changes (isothermal changes or the like). This case will be described below.

The state equation of the pressure chamber is represented by the following equation (14), assuming that the state change of the gas is the polytropic change.

$$\dot{P}_1 = -\frac{-nAP_1}{V_1} \dot{x}^* + \frac{nR\theta_1}{V_1} G'_1 \quad (14)$$

The state equation of a linearized model is represented by the following equation (15).

$$\dot{P}_1 = -\frac{-nA\overline{P}}{\overline{V}} \dot{x} + \frac{nR\theta_a}{\overline{V}} G_1 \quad (15)$$

Here, n is the polytropic index.

The volume V, the pressure P, and the temperature $\theta$ are changed, and a difference is generated between the linearized models because of the pressure change due to the servo valves flow rate determined with respect to the linearized model equation of the equation (15). In order to make the flow rate value, which is determined by using the linearized model, and the pressure response by the nonlinear model equation of the equation (14) the same, the following equations (16) and (17) may be used.

$$G'_1 = \frac{AV_1}{R\theta_1} \left( -\frac{\overline{P}}{\overline{V}} + \frac{P_1}{V_1} \right) \dot{x} + \frac{\theta_a}{\theta_1} \frac{V_1}{\overline{V}} G_1 \quad (16)$$

$$G'_2 = -\frac{AV_2}{R\theta_2} \left( -\frac{\overline{P}}{\overline{V}} + \frac{P_2}{V_2} \right) \dot{x} + \frac{\theta_a}{\theta_2} \frac{V_2}{\overline{V}} G_2 \quad (17)$$

Here, only the influence due to the volume change is compensated. When the pressure and temperature changes are ignored, $P_1 = P_2 = \overline{P}$ bar and $\theta_1 = \theta_2 = \theta_a$ are obtained, and the following equations (18) and (19) are obtained.

$$G'_1 = \frac{A\overline{P}}{R\theta_a} \left( -\frac{V_1}{\overline{V}} + 1 \right) \dot{x} + \frac{V_1}{\overline{V}} G_1 \quad (18)$$

$$G'_2 = -\frac{A\overline{P}}{R\theta_a} \left( -\frac{V_2}{\overline{V}} + 1 \right) \dot{x} + \frac{V_2}{\overline{V}} G_2 \quad (19)$$

Here, $G_1$ and $G_2$ are represented by the following equations (20) and (21), respectively.

$$G_1 = \frac{K_f \delta S_{e1} \overline{P}}{\sqrt{R\theta_a}} \quad (20)$$

$$G_2 = \frac{K_f S_{e2} \overline{P}}{\sqrt{R\theta_a}} \quad (21)$$

Here, $S_{e1}$ and $S_{e2}$ are the effective cross-sectional areas of the flow paths passing through the servo valves 22A and 22B, respectively. $S_{e1}$ and $S_{e2}$ are represented by the following equations (22) and (23), respectively, when the effective cross-sectional areas are represented.

$$S'_{e1} = \frac{A}{K_f \delta \sqrt{R\theta_a}} \left(-\frac{V_1}{V} + 1\right)\dot{x} + \frac{V_1}{V} S_{e1} \quad (22)$$

$$S'_{e2} = \frac{A}{K_f \sqrt{R\theta_a}} \left(-\frac{V_2}{V} + 1\right)\dot{x} + \frac{V_2}{V} S_{e2} \quad (23)$$

Further, when the position command value (voltage) is represented by the following equation, the following equations (24) and (25) are obtained.

$$S_{e1} = K_{se} u_1$$

$$S_{e2} = K_{se} u_2$$

$$u'_1 = \frac{A}{K_f \delta K_{se} \sqrt{R\theta_a}} \left(-\frac{V_1}{V} - 1\right)\dot{x} + \frac{V_1}{V} u_1 \quad (24)$$

$$u'_2 = -\frac{A}{K_f K_{se} \sqrt{R\theta_a}} \left(-\frac{V_2}{V} - 1\right)\dot{x} + \frac{V_2}{V} u_2 \quad (25)$$

In the calculation (5) by the control calculation device 20, the equations (24) and (25) may be used instead of the equations (10) and (11).

In this way, as in the case where the state change of the gas is the adiabatic change, the positioning control of adding compensation for the dynamic characteristics change due to the positional change of the slider can be performed.

In order to compensate for the volume change amount of the dynamic characteristics change caused by the positional change of the slider 13 and the pressure receiving plate 17, it is necessary to calculate the position command value in which the volume change amount is compensated. For the calculation, as is clear from equations (10) to (14) or equations (24) and (25), the volumes $V_1$ and $V_2$ of the pressure chambers 16A and 16B are required. As described above, since the cross-sectional area inside the slider 13 is constant with respect to the axial direction and is known, the volumes $V_1$ and $V_2$ can be calculated by knowing the position of the slider 13. The position of the slider 13 can be detected by the position sensor 15.

In order to specify the position of the slider 13 by using the position detection signal from the position sensor 15, it is necessary to perform an "origin positioning" after the power of the control calculation device 20 is turned on. The origin positioning is a process in which the control calculation device 20 recognizes an origin O determined by a user as the origin. Therefore, in order to compensate for the volume change amount of the dynamic characteristics change caused by the positional change of the pressure receiving plate 17, it is necessary to perform the origin positioning after the power is turned on.

First, a case where the position sensor 15 is an absolute type position sensor will be described. The origin positioning in this case is a process in which the control calculation device 20 reads origin information stored in a predetermined storage into a main memory. The origin information is the position information corresponding to the origin O, and is the position information indicated by the position detection signal output by the absolute type position sensor 15 when the slider 13 is positioned at the origin O. The origin information may be specified when the absolute type position sensor 15 is installed and stored in the storage in advance.

Next, a case where the position sensor 15 is an incremental type position sensor will be described. The origin positioning in this case may be, for example, a process of initializing a count number by the sensor when the slider 13 is positioned at the origin O or may be a process of specifying the count number when the slider 13 is positioned at the origin O.

Specifically, for example, when a movable end on one side (for example, the right side in FIG. 1) is defined as the origin O, the control calculation device 20 may initialize the count number when the slider 13 reaches the movable end on the one side as the origin positioning by moving the slider 13 toward the movable end on the one side.

Further, for example, when a position of a predetermined distance from the movable end on one side is defined as the origin O, the control calculation device 20 may initialize the count number when the slider 13 reaches the position of the predetermined distance from the movable end on the one side as the origin positioning by moving the slider 13 toward the movable end on the one side and moving the slider 13 toward the movable end on the other side when the slider 13 reaches the movable end on the one side.

Further, for example, a slider detection sensor (not shown) that is disposed so as to detect the slider 13 when the slider 13 is positioned at the origin O is further included, and the control calculation device 20 may initialize the count number when the slider detection sensor detects the slider 13, as the origin positioning by moving the slider 13. In this case, for example, the slider 13 may be moved to the movable end on one side as a pre-processing for the origin positioning and may be moved from the movable end on the one side to the movable end on the other side in the origin positioning.

When the slider 13 is moved for the origin positioning, since the position of the slider 13 is not yet known, and therefore the volumes $V_1$ and $V_2$ are also not known, the positioning control of adding compensation for the dynamic characteristics change cannot be performed. Therefore, the control calculation device 20 does not execute the above-mentioned calculation (5) for the origin positioning, and in the calculation (6), the position command value $u_1$ (=u) is output to the servo amplifier 21A instead of the position command value $u_1'$, and the position command value $u_2$ (=−u) is output to the servo amplifier 21B instead of the position command value $u_2'$. That is, the positioning control of adding compensation for the dynamic characteristics change is not performed for the origin positioning.

Here, in the equation (9) for calculating the position command value u, the proportional gain $K_p$, the velocity gain $K_v$, and the acceleration gain $K_a$ are gains designed on the premise that the positioning control of adding compensation for the dynamic characteristics change due to the positional change of the slider is performed. In the origin positioning in which compensation for the dynamic characteristics change is not added as described above, when the gain designed on the premise that compensation for the dynamic characteristics change is added, there is a possibility of unintended movement such as oscillation of the slider 13. Therefore, more preferably, in the equation (9), until the origin positioning is completed, the proportional gain $K_{p0}$ ($<K_p$), the velocity gain $K_{v0}$ ($<K_v$), and the acceleration gain $K_{a0}$ ($<K_a$) may be used instead of the proportional gain $K_p$, the velocity gain $K_v$, and the acceleration gain $K_a$. For example, each of the proportional gain $K_{p0}$, the velocity gain $K_{v0}$, and the acceleration gain $K_{a0}$ may be determined based on, for example, the user's knowledge, and for example, may be ½ times, ⅕ times, 1/10 times, or 1/100 times the proportional gain $K_p$, the velocity gain $K_v$, and the acceleration gain $K_a$. In this case, it is possible to reduce the possibility of unintended movement of the slider 13 for the origin positioning.

After the origin positioning is completed, the positioning control of adding compensation for the dynamic characteristics change is performed. Further, in that case, in the equation (9) for calculating the position command value u, the proportional gain $K_p$, the velocity gain $K_v$, and the acceleration gain $K_a$ is used. That is, the gain is switched from the gain for the origin positioning to the gain designed on the premise that the positioning control of adding compensation for the dynamic characteristics change is performed.

When switching is performed from a state where the compensation is not added to a state where the compensated is added, in order to avoid the unintended movement such as oscillation of the slider 13 by any chance, the switching may be executed after moving the slider 13 to a neutral point N where the volumes $V_1$ and $V_2$ of the pressure chambers 16A and 16B are equal to each other. The neutral point N can be specified based on the origin O when a distance from the origin O is specified in advance. Of course, the origin O may be set so that the neutral point N is the origin.

According to the present embodiment described above, since the origin positioning is executed for the position of the slider, the position of the slider 13 and the volumes $V_1$ and $V_2$ of each of the pressure chambers 16A and 16B can be calculated, and the position command value, in which the volume change amount of the dynamic characteristics change due to the position of the slider 13 is compensated, can be calculated.

Further, according to the present embodiment, before and after the origin positioning is completed, the gain at the time when calculating the position command value, is switched between the gain for the origin positioning and the gain designed on the premise that the positioning control of adding compensation for the dynamic characteristics change due to the positional change of the slider is performed. As a result, for the origin positioning, it is possible to reduce the possibility of the unintended movement of the slider 13 by decreasing the gain, and for the positioning control of adding compensation for the dynamic characteristics change, it is possible to improve controllability by increasing the gain.

The present invention has been described above based on the embodiment. The embodiment is an example, and it is understood by those skilled in the art that various modifications are possible for each of these component and combinations of each processing process, and such modifications are also within the scope of the present invention.

It should be understood that the invention is not limited to the above-described embodiment, but may be modified into various forms on the basis of the spirit of the invention. Additionally, the modifications are included in the scope of the invention.

What is claimed is:

1. A control method of a gas pressure actuator which includes a guide portion and a slider configured to move along the guide portion, and in which a cylinder chamber is formed between the guide portion and the slider, a pressure receiving plate for partitioning the cylinder chamber into two pressure chambers in a moving direction is provided in one of the guide portion and the slider, and the slider is driven by a differential pressure between the two pressure chambers by allowing compressed gas to enter and exit each of the two pressure chambers via two servo valves, the gas pressure actuator including
    a position sensor for detecting a position of the slider,
    two servo amplifiers for controlling each of the two servo valves, and
    a control calculation device that receives a position detection signal from the position sensor and outputs a position command value to the two servo amplifiers,
the control method comprising:
causing the control calculation device to
    perform a calculation of compensating for a volume change amount of each pressure chamber caused by a positional change of the pressure receiving plate inside the cylinder chamber, for each position command value applied to the two servo amplifiers, and thereafter
    output each of compensated position command values to the two servo amplifiers,
    execute origin positioning for the position of the slider in order to compensate for the volume change amount, and
    switch a gain at a time when each position command value applied to the two servo amplifiers is calculated based on the position detection signal from the position sensor, before and after a completion of the origin positioning.

2. A control method of a gas pressure actuator which includes a guide portion and a slider configured to move along the guide portion, and in which a cylinder chamber is formed between the guide portion and the slider, a pressure receiving plate for partitioning the cylinder chamber into two pressure chambers in a moving direction is provided in one of the guide portion and the slider, and the slider is driven by a differential pressure between the two pressure chambers by allowing compressed gas to enter and exit each of the two pressure chambers via two servo valves, the gas pressure actuator including
    a position sensor for detecting a position of the slider,
    two servo amplifiers for controlling each of the two servo valves, and
    a control calculation device that receives a position detection signal from the position sensor and outputs a position command value to the two servo amplifiers,
the control method comprising:
causing the control calculation device to switch a gain at a time when each position command value applied to the two servo amplifiers is calculated based on the position detection signal from the position sensor, before and after a completion of origin positioning for the position of the slider.

3. A control calculation device for a gas pressure actuator which includes a guide portion and a slider configured to move along the guide portion, and in which a cylinder chamber is formed between the guide portion and the slider, a pressure receiving plate for partitioning the cylinder chamber into two pressure chambers in a moving direction is provided in one of the guide portion and the slider, and the slider is driven by a differential pressure between the two pressure chambers by allowing compressed gas to enter and exit each of the two pressure chambers via two servo valves, the gas pressure actuator including
    a position sensor for detecting a position of the slider, and
    two servo amplifiers for controlling each of the two servo valves, the control calculation device receiving a position detection signal from the position sensor and outputting a position command value to the two servo amplifiers, wherein
the control calculation device is configured to
    perform a calculation of compensating for a volume change amount of each pressure chamber caused by a positional change of the pressure receiving plate inside the cylinder chamber for each position command value applied to the two servo amplifiers, and thereafter output each of compensated position command values to the two servo amplifiers, execute origin positioning for the position of the slider in order to compensate for the volume change amount, and switch a gain at a time when each position command value applied to the two servo amplifiers is calculated based on the position detection signal from the position sensor, before and after a completion of the origin positioning.

4. A control calculation device for a gas pressure actuator which includes a guide portion and a slider configured to move along the guide portion, and in which a cylinder chamber is formed between the guide portion and the slider, a pressure receiving plate for partitioning the cylinder chamber into two pressure chambers in a moving direction is provided in one of the guide portion and the slider, and the slider is driven by a differential pressure between the two pressure chambers by allowing compressed gas to enter and exit each of the two pressure chambers via two servo valves, the gas pressure actuator including a position sensor for detecting a position of the slider, and two servo amplifiers for controlling each of the two servo valves, the control calculation device receiving a position detection signal from the position sensor and outputting a position command value to the two servo amplifiers, wherein the control calculation device is configured to switch a gain at a time when each position command value applied to the two servo amplifiers is calculated based on the position detection signal from the position sensor, before and after a completion of origin positioning for the position of the slider.

\* \* \* \* \*